United States Patent
Bonta et al.

(10) Patent No.: US 7,773,941 B2
(45) Date of Patent: Aug. 10, 2010

(54) METHOD AND SYSTEM FOR POSITIONING A RELAY IN A WIDE AREA COMMUNICATION NETWORK

(75) Inventors: Jeffrey D. Bonta, Arlington Heights, IL (US); Mark A. Birchler, Roselle, IL (US)

(73) Assignee: Motorola, Inc., Schaumburg, IL (US)

( * ) Notice: Subject to any disclaimer, the term of this patent is extended or adjusted under 35 U.S.C. 154(b) by 474 days.

(21) Appl. No.: 11/461,270

(22) Filed: Jul. 31, 2006

(65) Prior Publication Data

US 2008/0039016 A1 Feb. 14, 2008

(51) Int. Cl.
H04B 37/15 (2006.01)
H04B 3/36 (2006.01)
H04B 7/14 (2006.01)
H04W 24/00 (2009.01)

(52) U.S. Cl. .................. 455/11.1; 455/456.1; 455/7; 455/16

(58) Field of Classification Search ............. 455/426.1, 455/426.2, 11.1, 7, 16, 41.1, 15, 13.3, 167, 455/456.1; 375/211; 370/342
See application file for complete search history.

(56) References Cited

U.S. PATENT DOCUMENTS

| | | | | |
|---|---|---|---|---|
| 5,223,816 A * | 6/1993 | Levinson et al. | ....... | 340/539.13 |
| 6,456,853 B1 * | 9/2002 | Arnold | ..................... | 455/456.1 |
| 6,735,417 B2 * | 5/2004 | Fonseca et al. | ............. | 455/11.1 |
| 6,963,739 B2 * | 11/2005 | Dorenbosch et al. | ........ | 455/406 |
| 7,110,715 B2 * | 9/2006 | Gupta | ........................ | 455/11.1 |
| 7,149,197 B2 * | 12/2006 | Garahi et al. | ................ | 370/328 |
| 2002/0183038 A1 | 12/2002 | Comstock et al. | | |
| 2006/0159033 A1 * | 7/2006 | Suzuki et al. | ................ | 370/254 |

OTHER PUBLICATIONS

PCT/US07/73756—PCT Search Report and Written Opinion—Mailed Aug. 29, 2008—9 pages.

* cited by examiner

Primary Examiner—Tilahun Gesesse
(74) Attorney, Agent, or Firm—Randi L. Karpinia

(57) ABSTRACT

A method and system for positioning a relay in a wide area communication network can enable improved operating efficiency of the network. The method includes processing a plurality of requests, received from a plurality of wireless communication devices, for connections to the network, where each device in the plurality of wireless communication devices can operate using a wide area networking standard and can operate using an ad hoc networking standard (step 305). A location in the network of each device in the plurality of wireless communication devices is then determined (step 310). An operating position for the relay is then determined based on an evaluation of the location in the network of each device in the plurality of wireless communication devices (step 315).

20 Claims, 3 Drawing Sheets

METHOD AND SYSTEM FOR POSITIONING A RELAY IN A WIDE AREA COMMUNICATION NETWORK

FIELD OF THE INVENTION

The present invention relates generally to wide area communication networks involving dual mode wireless communication devices. In particular, the invention relates to positioning a relay to enable wireless communication devices to operate using an ad hoc networking standard.

BACKGROUND OF THE INVENTION

Recent third generation digital cellular communication systems, such as Universal Mobile Telecommunications System (UMTS) and Code Division Multiple Access IX Evolution-Data Optimized (CDMA 1X Ev/Do) systems, are designed to offer higher data rates to subscribers than previous systems such as Global System for Mobile (GSM) communications or CDMA IS-95 systems. However, higher data rates are generally available only where radio frequency propagation characteristics are favorable and where local system capacity demands are low. Such limitations can significantly restrict the practical utility of an offered high data rate service.

Dual mode wireless communication devices enable multimedia content to be delivered across multiple networks, such as cellular, Wireless Fidelity (Wi-Fi), broadband or Worldwide Interoperability for Microwave Access (WiMAX) networks, and can provide an improved Quality of Service (QoS) by utilizing the best performing (e.g., based on measured signal strength) network relative to a user's location. For example, a dual-mode cellular telephone user inside a building may first place a call by connecting to a wireless fidelity (Wi-Fi) access point. If the user then leaves the building while maintaining the connection to the Wi-Fi access point, the telephone can sense that the Wi-Fi signal gets weaker while an available cellular signal gets stronger. The telephone will therefore seamlessly switch modes, using voice call continuity (VCC) technology, and transfer the call to a cellular network.

To meet demands for broadband service, access points offering Internet access through ad hoc networking standards are commonly deployed by third party service providers in locations where there is a perceived need for high data rate service. However, choosing such locations is often based primarily on convenience rather than actual demonstrated need. For example, a service provider may establish an access point at each store of a particular coffee store chain with which the service provider has completed an agreement. But such convenience-based locations for access points can be significantly different from actual need-based locations, resulting in less efficient communication networks and a lower quality of service for network subscribers.

BRIEF DESCRIPTION OF THE DRAWINGS

In order that the invention may be readily understood and put into practical effect, reference now will be made to exemplary embodiments as illustrated with reference to the accompanying figures, wherein like reference numbers refer to identical or functionally similar elements throughout the separate views. The figures together with a detailed description below, are incorporated in and form part of the specification, and serve to further illustrate the embodiments and explain various principles and advantages, in accordance with the present invention, where.

Figure 1:
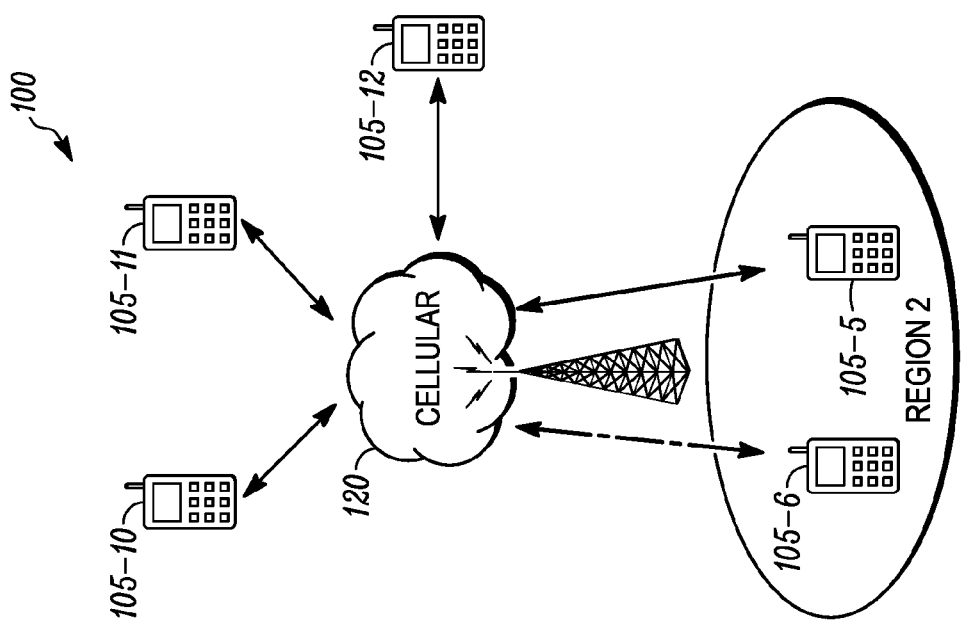
FIG. 1 is a schematic diagram illustrating communications in a third generation (3G) digital cellular communication network, according to the prior art.
Figure 1:
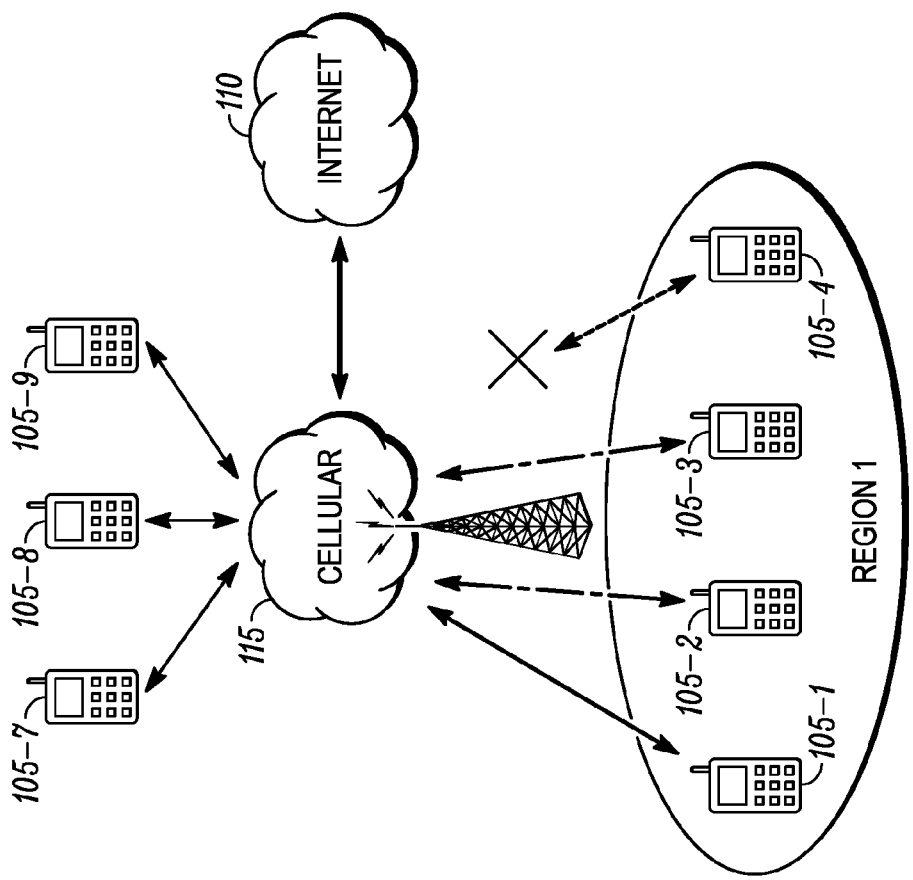

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to positioning a relay in a wide area communication network. Accordingly, the apparatus components and method steps have been represented where appropriate by conventional symbols in the drawings, showing only those specific details that are pertinent to understanding the embodiments of the present invention, so as not to obscure the disclosure with details that will be readily apparent to those of ordinary skill in the art having the benefit of the description herein.

In this document, relational terms such as left and right, first and second, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of positioning a relay in a wide area communication network as described herein. The non-processor circuits may include, but are not limited to, a radio receiver, a radio transmitter, signal drivers, clock circuits, power source circuits, and user input devices. As such, these functions may be interpreted as steps of a method for positioning a relay in a wide area communication network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Referring to FIG. 1, a schematic diagram illustrates communications in a third generation (3G) digital cellular communication network 100, according to the prior art. The network 100 comprises cellular subscriber equipment such as wireless communication devices 105-$n$ that can operate using a digital cellular standard and can operate using an ad hoc networking standard. For example, a wireless communication device 105-$n$ can be a dual mode mobile telephone that can operate using a 3G standard such as a Universal Mobile Telecommunication System (UMTS) standard and can operate using an ad hoc networking system standard such as an Institute of Electrical and Electronics Engineers (IEEE) 802.11 standard. Generally each wireless communication device 105-$n$ comprises dual transceivers, one that operates using a digital cellular standard and one that operates using an ad hoc networking standard.

For illustration purposes, consider that the following circumstances exist in the network 100. Wireless communication device 105-1 has a high data rate connection with the Internet 110 via a Universal Mobile Telecommunications System (UMTS) traffic channel that is routed through a UMTS cellular sub-network 115. Wireless communication devices 105-2 and 105-3 seek a high data rate connection with the Internet 110 utilizing UMTS signaling; however, the wireless communication device 105-1 is consuming too many traffic carrying resources in the network 100. Thus the wireless communication devices 105-2 and 105-3 receive substandard connectivity to the Internet 110 via the UMTS cellular sub-network 115. Wireless communication device 105-4 also seeks a high data rate connection with the Internet 110 via a UMTS traffic channel; but poor coverage from the UMTS cellular sub-network 115 completely prohibits such a connection.

Further consider that the area labeled "Region 1" represents a first geographic region in the network 100. Consider that the devices 105-1, 105-2, 105-3 and 105-4 in Region 1 are capable of communicating with each other using an ad hoc networking standard that does not require routing communications through the UMTS cellular sub-network 115. However, according to the prior art, such dual mode capability generally is not used effectively to alleviate the network traffic problems described above.

Further consider that the wireless communication device 105-5 is maintaining a video session with wireless communication device 105-6 utilizing UMTS signaling through a UMTS cellular sub-network 120; but a shortage of UMTS system capacity prevents maintenance of a high quality video stream. For example, a higher data rate connection may have been needed for full resolution video, but a lower data rate connection had to be used that resulted in lower resolution video. The area labeled "Region 2" represents a second geographic region in the network 100 that includes the wireless communication devices 105-5 and 105-6. However, consider that the wireless communication devices 105-5 and 105-6 are not within range of each other to permit a single hop point-to-point connection between them. Other wireless communication devices 105-7, 105-8, 105-9, 105-10, 105-11, and 105-12 are also operating in the network 100.

The network 100 thus includes several communication problems, including lost communications and sub-standard quality of service, associated with an architecture of the network 100 and a failure to exploit the capabilities of the network 100. As described in detail below, methods and systems of the present invention are able to overcome such problems to improve network performance.

Figure 2:
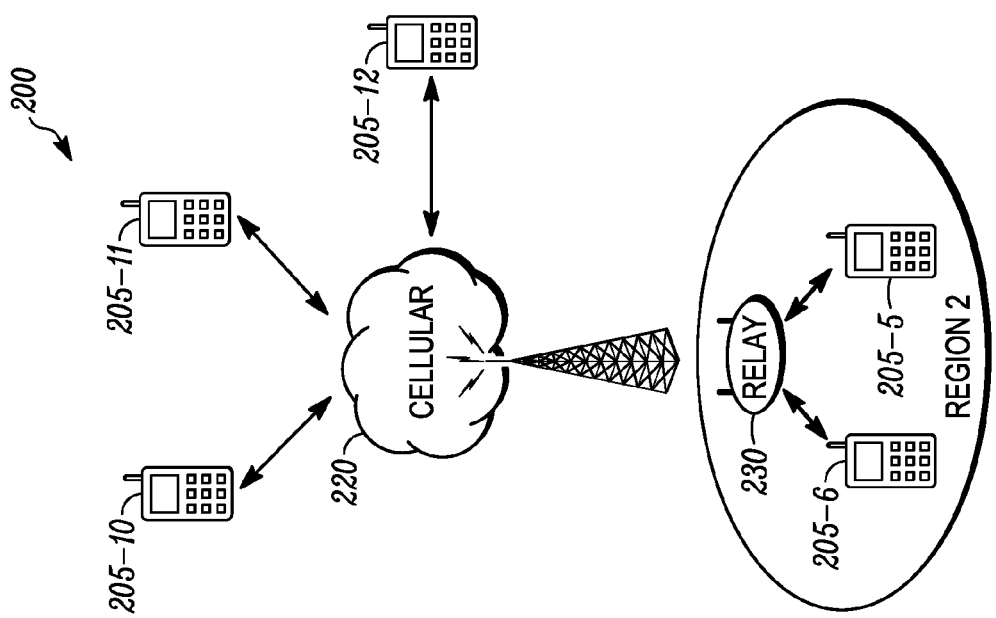
FIG. 2 is a schematic diagram illustrating communications in a third generation (3G) digital cellular communication network, according to some embodiments of the present invention.
Figure 2:
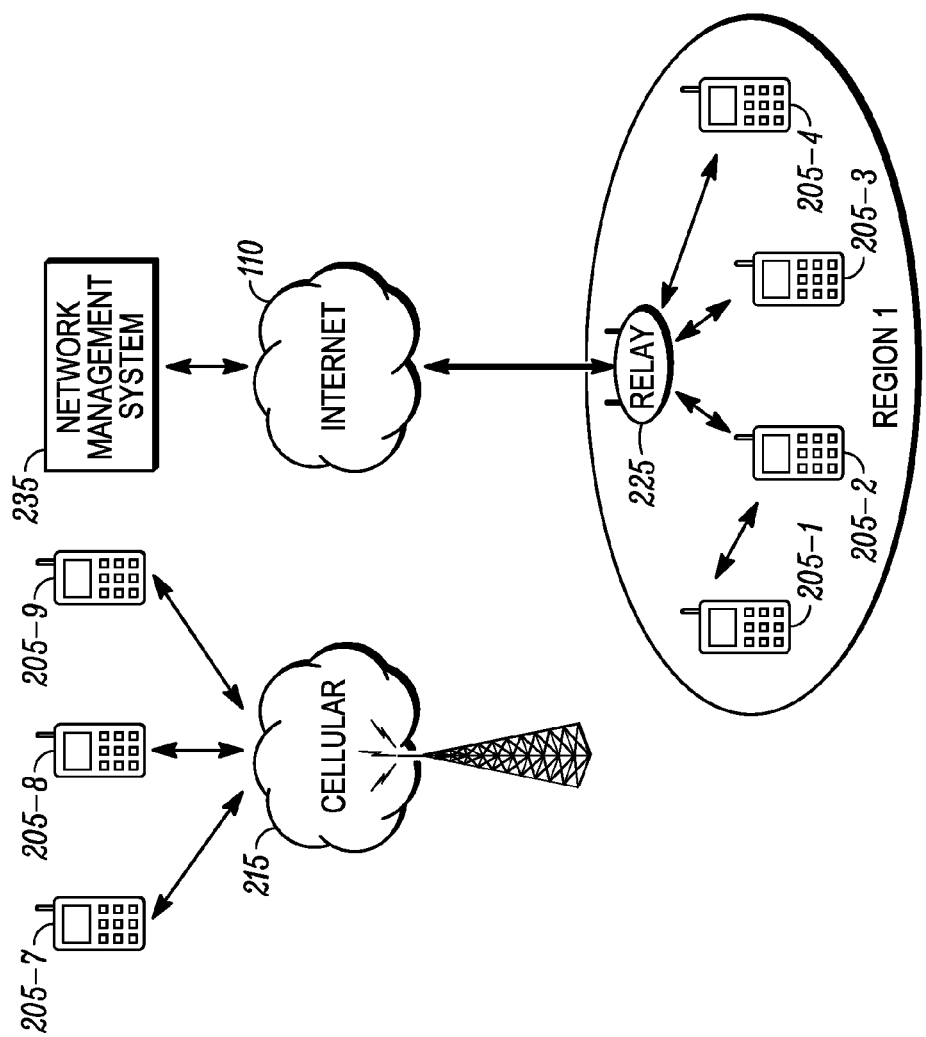

Referring to FIG. 2, a schematic diagram illustrates communications in a third generation (3G) digital cellular communication network 200, according to some embodiments of the present invention. The network 200 comprises cellular subscriber equipment such as wireless communication devices 205-$n$ that can operate using a digital cellular standard and can operate using an ad hoc networking standard. For example, a wireless communication device 205-$n$ can be a dual mode mobile telephone, computer, or other type of communication device that can operate using a 3G standard such as a Universal Mobile Telecommunication System (UMTS) standard and can operate using an ad hoc networking system standard such as an Institute of Electrical and Electronics Engineers (IEEE) 802.11 standard. Generally each wireless communication device 205-$n$ comprises dual transceivers, one that operates using a digital cellular standard and one that operates using an ad hoc networking standard.

For illustration purposes, consider that the following circumstances exist in the network 200. The relative geographic positions of the wireless communication devices 205-$n$ in the network 200 correspond, respectively, to the relative geographic positions of the wireless communication devices 105-$n$ in the network 100 associated with the prior art. Also, consider that the areas Region 1 and Region 2 shown in FIG. 1 correspond to the areas Region 1 and Region 2 shown in FIG. 2, where in both FIG. 1 and FIG. 2 the same or similar geographic regions are represented. However, in the network 200, Region 1 further comprises a fixed relay 225 and Region 2 further comprises a fixed relay 230. The fixed relays 225, 230 can alleviate service restrictions, such as the service restrictions described above concerning the network 100, by providing direct access to the Internet 110 and to other elements in the network 200.

For example, consider that the wireless communication devices 205-2, 205-3, and 205-4 are in direct communication with the fixed relay 225 using IEEE 802.11 ad hoc air interfaces. That enables the wireless communication devices 205-2, 205-3, and 205-4 to have a high speed connection to the Internet 110 through the fixed relay 225. Also, consider that the wireless communication device 205-1 cannot communicate directly with the fixed relay 225 due to propagation conditions; however, wireless access from the wireless communication device 205-1 to the fixed relay 225 is provided by utilizing IEEE 802.11 ad hoc networking capabilities to create a multi-hop connection to the fixed relay 225 via the wireless communication device 205-2 that functions as an intermediate routing device. Further, in Region 2, wireless communication devices 205-5 and 205-6 can achieve a high quality video connection between each other by utilizing the fixed relay 230 and IEEE 802.11 ad hoc air interfaces.

Thus the provision of the fixed relays 225 and 230 in Region 1 and Region 2, respectively, enables the network 200 to offload demands of applications in Region 1 and Region 2, such as high data rate applications, from UMTS air interfaces with cellular sub-networks 215 and 220 to IEEE 802.11 ad hoc air interfaces. That enables the network 200 to have additional capacity to support other applications such as standard voice connections associated with other devices such as wireless communication devices 205-7, 205-8, 205-9, 205-10, 205-11, and 205-12.

Determining where to position the fixed relays 225 and 230 can be done, according to some embodiments of the present invention, through collection of network data traffic metrics by the network 200. For example, each time a wireless communication device 205-*n* makes a request for a bandwidth allocation to support a high data rate application as either the sender or receiver of data, a network management system 235 in the network 200 is informed. The network management system 235 invokes a procedure to obtain the location of the wireless communication device 205-*n*. A high data rate application can be, for example, any application that requires more bandwidth than required by a basic Voice over Internet Protocol (VoIP) connection, and the threshold that defines a high data rate application can be adjusted depending on the equipment, conditions and other circumstances of a particular network.

Many different techniques to estimate the geographic location of a wireless communication device 205-*n* are known to those skilled in the art. Such techniques include, for example, device-integrated Global Positioning System (GPS) techniques, Time Difference of Arrival (TDOA) techniques, Angle of Arrival (AOA) techniques, and Radio Frequency (RF) fingerprinting techniques. Thus, procedures to obtain the location of a wireless communication device 205-*n* in the network 200 can involve signaling with the wireless communication device 205-*n* either directly or via an auxiliary device.

After the location of a wireless communication device 205-*n* in the network 200 is determined, the network management system 235, which is operatively coupled to the network 200 through, for example, the Internet 110, can store the location in a database that identifies all requests for high data rate bandwidth allocations. Each database entry can include, for example, a time stamp to identify the freshness of the request. Periodically, the network management system 235 reviews the content of the database to search for trends that demonstrate consistent need for a fixed relay in a geographic region.

A geographic region, such as the Region 1 or the Region 2, can be determined based on a required propagation range that is necessary to enable single-hop wireless connectivity between a fixed relay and a sub-group of the wireless communication devices 205-*n* operating using an ad hoc networking standard. As will be understood by those skilled in the art, the propagation range can vary based on the height of an expected deployment of an antenna for a potential fixed relay in the region. The locations of all bandwidth allocation requests then can be examined and, using the propagation range of a potential fixed relay, the geometric center of the stored locations associated with requests for bandwidth allocations within the propagation range can be computed. Such geometric centers then represent potential single-hop fixed relay locations. If a number of requests for bandwidth allocations within the propagation range exceed a minimum value, then it may be economically worthwhile to position a fixed relay at such a geometric center.

Network operators can utilize well known business modeling techniques to predict whether, in a given geographic region, an operating position for a relay will be cost effective. Such business modeling techniques can evaluate, for example, whether costs associated with deploying a fixed relay will be more than offset by additional revenue associated with the provision of higher QoS broadband services using an ad hoc networking standard as well as by additional capacity freed up for delivery of revenue bearing services such as voice services using a digital cellular standard.

In order to minimize the number of potential fixed relays in overlapping geographic regions, an operating position for a relay also can be determined based on a required propagation range to enable multi-hop wireless connectivity between the relay and a plurality of wireless communication devices operating in a network. A multi-hop geographic region can be determined by examining the proximity of single-hop fixed relay locations as a function of time and a count of high data rate bandwidth allocation requests that share a same potential single-hop fixed relay. If the proximity of potential overlapping single-hop fixed relay locations is within the propagation range of the wireless communication devices 205-*n* that requested the high data rate bandwidth allocations, and the request is within a time tolerance, then the geometric center of the locations of the wireless communication devices 205-*n* associated with the proximate single-hop wireless locations is recomputed. The geometric center then becomes a potential multi-hop fixed relay location and the single-hop fixed relay locations are removed as potential candidates for a new fixed relay deployment. The potential candidate single-hop and multi-hop fixed relay locations then can be provided to a network operator so the operator can conduct a business analysis to determine if the addition of the one or more fixed relays will be economically advantageous. Alternatively, such a business analysis can be conducted automatically using business analysis algorithms.

Each time a fixed relay is deployed, the location of the fixed relay can be stored in a database within the network management system 235. As discussed previously, each time a wireless communication device 205-*n* makes a request for a bandwidth allocation to support a high data rate application as either the sender or receiver of data, the network management system 235 is informed. That enables the network management system 235 to evaluate, based on actual subscriber demands, where a particular fixed relay should be positioned so as to improve the overall operating efficiency of the network 200.

Consider, for example, that the network management system 235 is informed that the wireless communication device 205-2 has made a request for a bandwidth allocation to support a high data rate application as the sender of data. The network management system 235 then can estimate the location of the wireless communication device 205-2 and store the location. After the location is determined, the network management system 235 can compute the distance between the wireless communication device 205-2 and the location of each fixed relay 225, 230 operating in the network 200. If a computed distance is within a propagation range (considering for example propagation factors such as the height of fixed relay antennas and the elements in the local environment such as buildings, streets, intersections, etc.) of a particular fixed relay, such as the fixed relay 225, the network management system 235 sends an Internet Protocol (IP) address of the fixed relay 225 to the wireless communication device 205-2 via a UMTS air interface of the network 200. Reception of the IP address of the fixed relay 225 enables the wireless communication device 205-2 to activate its 802.11 ad hoc transceiver and begin a route discovery process to locate the fixed relay 225 and to enable the establishment of an ad hoc connection.

After the wireless communication device 205-2 discovers a route to the fixed relay 225, the wireless communication device 205-2 can transmit a request to the network management system 235 to utilize the fixed relay 225 as a relay to the destination IP address to which the wireless communication device 205-2 seeks to establish a connection. Since the fixed relay 225 is managed by a UMTS network operator for the network 200, the request enables the network management system 235 to appropriately charge the wireless communication device 205-2 for use of the fixed relay 225.

After processing the request to utilize the fixed relay 225, the network management system 235 can provide security information, such as a security key or authentication key, to the wireless communication device 205-2 that enables use of the fixed relay 225. The wireless communication device 205-2 then can establish an ad hoc connection with the fixed relay 225 using the security information. Once the connection with the fixed relay 225 is established, the wireless communication device 225-2 can begin a high speed data session with a desired destination IP address.

Figure 3:
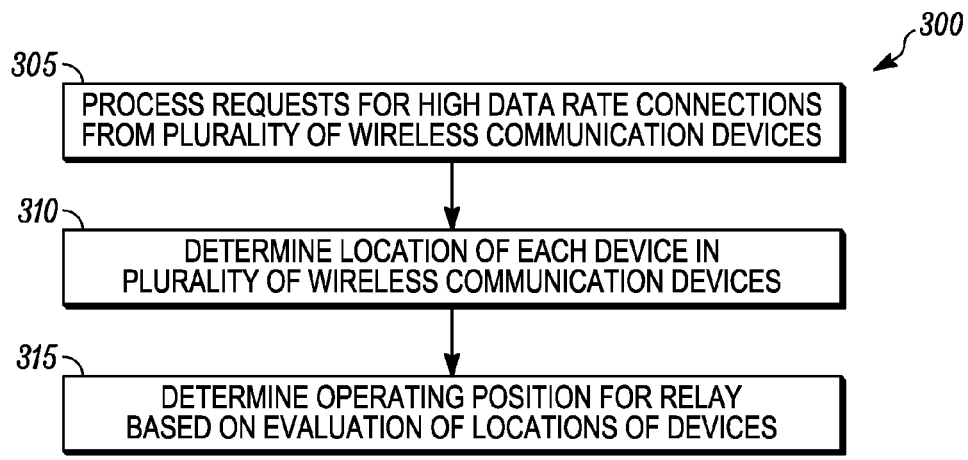
FIG. 3 is a general flow diagram illustrating a method for positioning a relay in a wide area communication network, according to some embodiments of the present invention.

Referring to FIG. 3, a general flow diagram illustrates a method 300 for positioning a relay in a wide area communication network, such as a digital cellular communication network, according to some embodiments of the present invention. At step 305, a plurality of requests, received from a plurality of wireless communication devices, for connections, such as high data rate connections, to the network are processed. For example, the network management system 235 in the digital cellular communication network 200 can process requests received over a period of time from a plurality of the wireless communication devices 205-n for connections to the network 200. Each device in the plurality of wireless communication devices can operate using a wide area networking standard and can operate using an ad hoc networking standard.

At step 310, a location in the network of each device in the plurality of wireless communication devices is determined. For example, the network management system 235 can determine the location in the network 200 of each wireless communication device 205-n that requests a connection to the network 200. The determined location of a wireless communication device 205-n is the location of the wireless communication device 205-n at the time that it requests a connection to the network 200.

At step 315, an operating position for the relay is determined based on an evaluation of the location in the network of each device in the plurality of wireless communication devices. For example, a geographic operating position for the fixed relay 225 is determined based on an evaluation of the locations, at the times that connections to the network 200 were made, of the wireless communication devices 205-n operating in the Region 1 shown in FIG. 2 that have requested connections to the network 200. An optimized operating position for a relay therefore can be determined based on actual, current subscriber demands.

Figure 4:
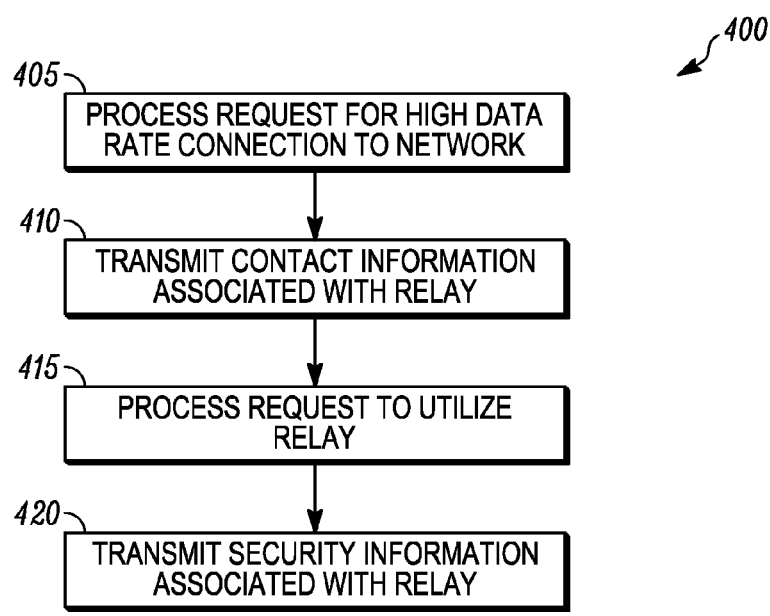
FIG. 4 is a general flow diagram illustrating a method for operating a relay in a wide area communication network, according to some embodiments of the present invention.

Referring to FIG. 4, a general flow diagram illustrates a method 400 for operating a relay in a wide area communication network, such as a digital cellular communication network, according to some embodiments of the present invention. For example, the method 400 can be used to operate a relay after the relay is positioned according to the method 300 described above. At step 405, a request for a connection, such as a high data rate connection, to the network is processed. The request is received from a wireless communication device operating within range of the relay after the relay becomes operational at the operating position. For example, after the fixed relay 225 becomes operational in the Region 1 shown in FIG. 2, the network management system 235 can process a request from the wireless communication device 205-2 for a connection to the network 200.

At step 410, contact information associated with the relay is transmitted to the wireless communication device operating within range of the relay. For example, an IP address of the fixed relay 225 can be transmitted from the network management system 235 to the wireless communication device 205-2 after the wireless communication device 205-2 requests a connection to the network 200. According to some embodiments of the present invention, contact information associated with the relay is transmitted only when it is determined that the network will operate more efficiently if the wireless communication device operates using an ad hoc networking standard rather than using a wide area networking standard. Such network control over whether individual wireless communication devices operate using a wide area networking standard or an ad hoc networking standard can improve the overall operating efficiency of the network.

At step 415, a request to utilize the relay to establish the connection to the network, received from the wireless communication device operating within range of the relay, is processed. The request is transmitted in response to the contact information transmitted at step 410. For example, the network management system 235 can process a request from the wireless communication device 205-2 to utilize the fixed relay 225 to establish a high data rate connection to the network 200.

At step 420, security information associated with the relay is transmitted to the wireless communication device operating within range of the relay, in response to the request to utilize the relay to establish the connection to the network. The wireless communication device operating within range of the relay can thus establish through the relay the connection to the network. For example, an authentication key associated with the fixed relay 225 can be transmitted from the network management system 235 to the wireless communication device 205-2, enabling the wireless communication device 205-2 to establish through the fixed relay 225 a connection to the network 200.

Figure 5:
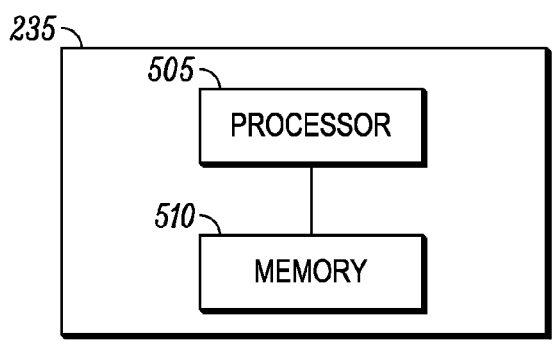
FIG. 5 is a schematic diagram illustrating components of a network management system operating in a digital cellular communication network, according to some embodiments of the present invention.

Referring to FIG. 5, a schematic diagram illustrates components of the network management system 235 operating in the digital cellular communication network 200, according to some embodiments of the present invention. As will be understood by those skilled in the art, the network management system 235 can be incorporated in various standard network components such as, for example, a base station or a radio network controller. The network management system 235 can include a processor 505 such as a standard microprocessor or application specific integrated circuit (ASIC) operatively coupled to a memory 510. The memory 510 comprises a computer readable medium such as a random access memory (e.g., static random access memory (SRAM)), read only memory (e.g., programmable read only memory (PROM), or erasable programmable read only memory (EPROM)), or hybrid memory (e.g., FLASH) as is well known in the art. The computer readable medium then comprises computer readable program code components that, when processed by the processor 505, are configured to cause the execution of the above described steps of the method 300 and the method 400.

Advantages of the present invention thus include improved operating efficiency in wide area communication networks such as third generation (3G) digital cellular communication networks that include dual mode wireless communication devices. Positions for fixed relays can be optimized based on actual needs of network users, which needs can be systematically measured and evaluated over a period of time. After a fixed relay is positioned, according to an embodiment of the present invention, a network management system then can be provided with a significant amount of control over whether individual wireless communication devices operating in the network communicate using a digital cellular standard or an ad hoc networking standard. Such control can be used to further improve the overall operating efficiency of the network.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any elements that may cause any benefit, advantage, or solution to occur or become more pronounced are not to be construed as critical, required, or essential features or elements of any or all of the claims. The invention is defined solely by the appended claims including any amendments made during the pendency of this application and all equivalents of those claims.

The invention claimed is:

1. A method for positioning a relay in a wide area communication network, the method comprising within a network management system:
   processing a plurality of requests, received from a plurality of wireless communication devices, for connections to the network, wherein each device in the plurality of wireless communication devices can operate using a wide area networking standard and can operate using an ad hoc networking standard;
   determining a location in the network of each device in the plurality of wireless communication devices; and
   determining an operating position for the relay based on an evaluation of the location in the network of each device in the plurality of wireless communication devices.

2. The method of claim 1, wherein the operating position for the relay is determined based also on a required propagation range to enable single-hop wireless connectivity between the relay and each device in the plurality of wireless communication devices.

3. The method of claim 1, wherein the operating position for the relay is determined based also on a required propagation range to enable single-hop or multi-hop wireless connectivity between the relay and each device in the plurality of wireless communication devices.

4. The method of claim 3, wherein at least one device in the plurality of wireless communication devices functions as an intermediate routing device to enable the multi-hop wireless connectivity.

5. The method of claim 1, wherein the location in the network of a particular device in the plurality of wireless communication devices is determined by the network management system after processing a request from the particular device for a connection to the network.

6. The method of claim 1, further comprising:
   processing a request, received from a wireless communication device operating within range of the relay after the relay becomes operational at the operating position, for a connection to the network; and
   transmitting, to the wireless communication device operating within range of the relay, contact information associated with the relay.

7. The method of claim 6, further comprising processing a request, received from the wireless communication device operating within range of the relay, in response to the contact information, to utilize the relay to establish the connection to the network.

8. The method of claim 7, further comprising transmitting, to the wireless communication device operating within range of the relay, in response to the request to utilize the relay to establish the connection to the network, security information associated with the relay, whereby the wireless communication device operating within range of the relay can establish through the relay the connection to the network.

9. The method of claim 6, wherein the contact information associated with the relay is transmitted only if it is determined that the wireless communication device should operate using the ad hoc networking standard and should not operate using the wide area networking standard.

10. The method of claim 1, wherein business modeling techniques are used to predict whether the operating position for the relay will be cost effective.

11. A network management system for positioning a relay in a wide area communication network, the system comprising:
    a computer readable medium for storing computer readable program code components configured to:
      cause processing of a plurality of requests, received from a plurality of wireless communication devices, for connections to the network, wherein each device in the plurality of wireless communication devices can operate using a wide area networking standard and can operate using an ad hoc networking standard;
      cause determining of a location in the network of each device in the plurality of wireless communication devices; and
      computer readable program code components configured to cause determining of an operating position for the relay based on an evaluation of the location in the network of each device in the plurality of wireless communication devices.

12. The system of claim 11, wherein the operating position for the relay is determined based also on a required propagation range to enable single-hop wireless connectivity between the relay and each device in the plurality of wireless communication devices.

13. The system of claim 11, wherein the operating position for the relay is determined based also on a required propagation range to enable either single-hop or multi-hop wireless connectivity between the relay and each device in the plurality of wireless communication devices.

14. The system of claim 13, wherein at least one device in the plurality of wireless communication devices functions as an intermediate routing device to enable the multi-hop wireless connectivity.

15. The system of claim 11, wherein the location in the network of a particular device in the plurality of wireless communication devices is determined by a network management system after processing a request from the particular device for a connection to the network.

16. The system of claim 11, wherein the computer readable program code components are further configured to:
    cause processing of a request, received from a wireless communication device operating within range of the relay after the relay becomes operational at the operating position, for a connection to the network; and
    cause transmitting, to the wireless communication device operating within range of the relay, of contact information associated with the relay.

17. The system of claim 16, wherein the computer readable program code components are further configured to cause processing of a request, received from the wireless communication device operating within range of the relay, in response to the contact information, to utilize the relay to establish the connection to the network.

18. The system of claim 17, wherein the computer readable program code components are further configured to cause transmitting, to the wireless communication device operating within range of the relay, in response to the request to utilize the relay to establish the connection to the network, of security information associated with the relay, whereby the wireless communication device operating within range of the relay can establish through the relay the connection to the network.

19. The system of claim 16, wherein the contact information associated with the relay is transmitted only if it is determined that the wireless communication device should operate using the ad hoc networking standard and should not operate using the wide area networking standard.

20. The system of claim 11, wherein business modeling techniques are used to predict whether the operating position for the relay will be cost effective.

* * * * *